United States Patent
Scobel

(10) Patent No.: US 10,639,702 B2
(45) Date of Patent: May 5, 2020

(54) METHOD AND COATING DEVICE FOR APPLYING A CLADDING LAYER DURING THE PRODUCTION OF A MULTILAYER HEAVY-DUTY PIPE

(71) Applicant: Eisenbau Krämer GmbH, Recklinghausen (DE)

(72) Inventor: Peter Scobel, Marl (DE)

(73) Assignee: Eisenbau Kramer GmbH, Recklinghausen (DE)

( * ) Notice: Subject to any disclaimer, the term of this patent is extended or adjusted under 35 U.S.C. 154(b) by 169 days.

(21) Appl. No.: 15/555,700

(22) PCT Filed: Feb. 22, 2016

(86) PCT No.: PCT/EP2016/053686
§ 371 (c)(1),
(2) Date: Sep. 5, 2017

(87) PCT Pub. No.: WO2016/142162
PCT Pub. Date: Sep. 15, 2016

(65) Prior Publication Data
US 2018/0050382 A1 Feb. 22, 2018

(30) Foreign Application Priority Data

Mar. 6, 2015 (DE) .................. 10 2015 103 338
Mar. 6, 2015 (DE) .................. 20 2015 101 441 U
Mar. 31, 2015 (DE) .................. 10 2015 105 006

(51) Int. Cl.
*B21D 39/04* (2006.01)
*B21C 37/15* (2006.01)
(Continued)

(52) U.S. Cl.
CPC .......... *B21D 39/048* (2013.01); *B21C 37/154* (2013.01); *B21D 39/04* (2013.01);
(Continued)

(58) Field of Classification Search
CPC .. B21D 39/10–12; B21D 39/18; B21D 39/04; B21D 39/048; B23P 11/005;
(Continued)

(56) References Cited

U.S. PATENT DOCUMENTS

| 381,583 A | * | 4/1888 | Robinson ............... B21D 39/10 |
| | | | 72/126 |
| 1,536,498 A | * | 5/1925 | Horvath ................ B21D 39/10 |
| | | | 72/123 |

(Continued)

FOREIGN PATENT DOCUMENTS

| CN | 107405673 A | 11/2017 |
| DE | 10 2005 029679 A1 | 12/2006 |
| JP | S59 78715 A | 5/1984 |
| WO | 2004/103603 A1 | 12/2004 |

OTHER PUBLICATIONS

Translation of DE102005029679 (Year: 2006).*

*Primary Examiner* — Matthew P Travers
(74) *Attorney, Agent, or Firm* — Jansson Munger McKinley & Kirby Ltd.

(57) ABSTRACT

The invention relates to a method and a coating device for applying a cladding layer onto the inner side of a carrier layer during the production of a multilayer heavy-duty pipe, with a pressure-exerting unit having a force application unit. A stable application of the cladding layer is achieved by having the coating device comprise a rolling tool with the pressure-exerting unit and the force application unit, and by providing the pressure-exerting unit with at least one pressure roller having a diameter that is smaller than the inside diameter of the heavy-duty pipe to be produced, and with at least one support element acting diametrically counter thereto with a supporting force in the operating state.

12 Claims, 3 Drawing Sheets

(51) Int. Cl.
*F16L 13/14* (2006.01)
*B23P 11/00* (2006.01)
(52) U.S. Cl.
CPC ......... *B23P 11/005* (2013.01); *B32B 2597/00* (2013.01); *F16L 13/147* (2013.01)
(58) Field of Classification Search
CPC ... B32B 37/0053; B32B 1/08; B32B 2597/00; E21B 43/103; E21B 43/105; E21B 43/108; F16L 2013/145; F16L 13/147; F16L 9/02; F16L 9/18; B21C 37/154; B21C 37/30; B24B 39/02; Y10T 29/47; Y10T 29/4994
See application file for complete search history.

(56) References Cited

U.S. PATENT DOCUMENTS

| | | | | | |
|---|---|---|---|---|---|
| 2,174,803 | A | * | 10/1939 | Mundt | B21C 37/30 15/104.14 |
| 2,395,450 | A | * | 2/1946 | Browning | B29C 63/0004 118/118 |
| 2,600,800 | A | * | 6/1952 | Pace | B21D 39/10 29/888.061 |
| 4,791,712 | A | * | 12/1988 | Wells | B21D 39/04 188/322.22 |
| 6,695,063 | B2 | * | 2/2004 | Lauritzen | E21B 33/1295 166/207 |
| 2007/0010173 | A1 | * | 1/2007 | Takashima | B21H 7/18 451/28 |

\* cited by examiner

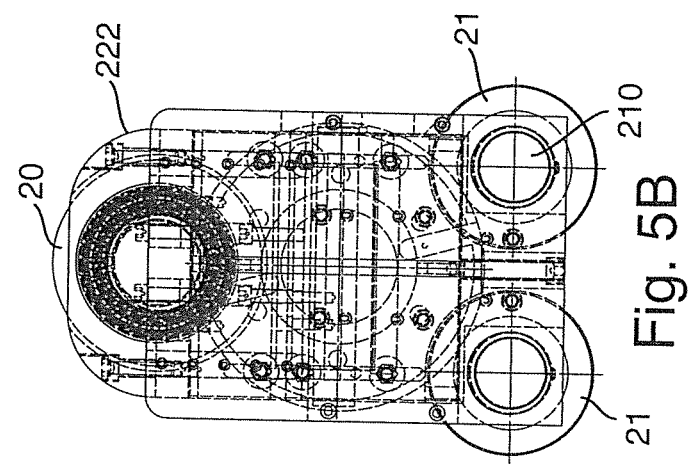
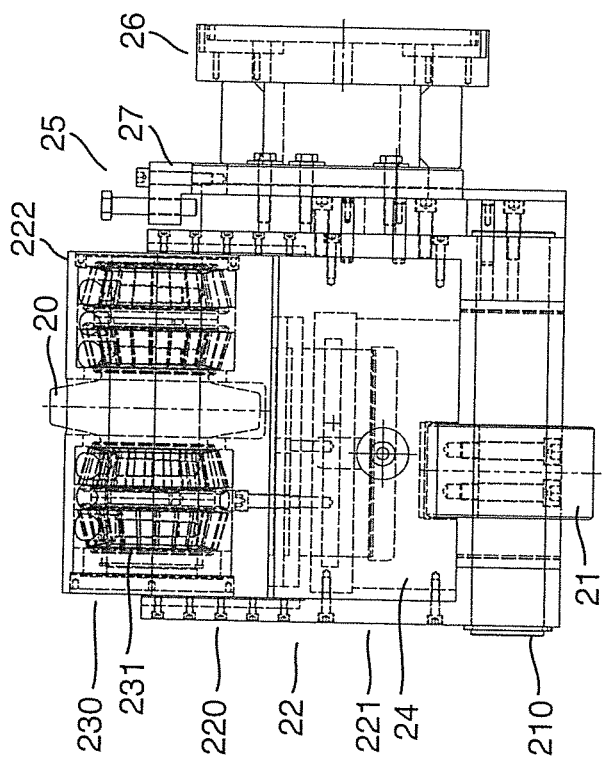
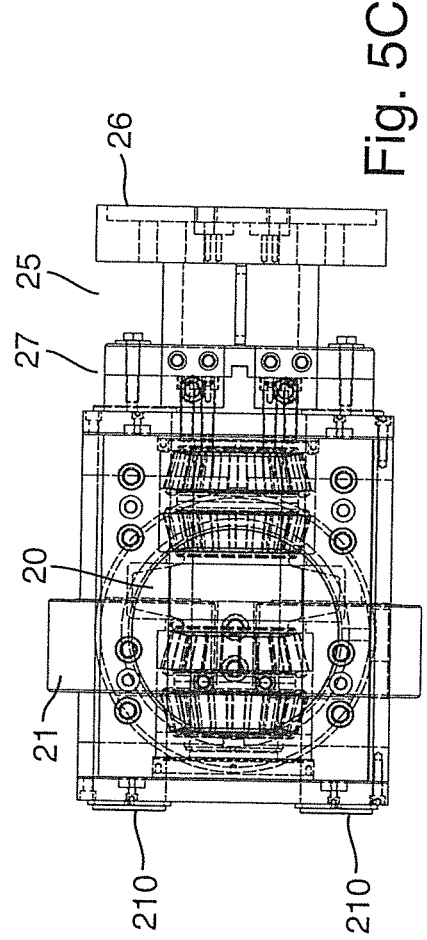
Fig. 5B
Fig. 5A
Fig. 5C

US 10,639,702 B2

METHOD AND COATING DEVICE FOR APPLYING A CLADDING LAYER DURING THE PRODUCTION OF A MULTILAYER HEAVY-DUTY PIPE

CROSS-REFERENCE TO RELATED APPLICATION

The present application is a U.S. national phase entry of pending International Patent Application No. PCT/EP2016/053686, international filing date Feb. 22, 2016, which claims priority to German Patent Application No. DE 20 2015 103 338.0, filed Mar. 6, 2015, the contents of which are incorporated by reference in their entireties.

FIELD OF THE INVENTION

The invention relates to a method for producing a multilayer heavy-duty pipe with a pipe unit that is composed of an outer pipe forming a carrier layer and at least one inner pipe forming a cladding layer, as well as to a coating device for applying the cladding layer to the interior of the carrier layer with a pressure-exerting unit having a force application unit.

BACKGROUND OF THE INVENTION

DE 10 2005 029 679 A1 describes a device and a method for joining pipe profiles with an inner pipe profile in an outer pipe profile through expansion by means of a rolling element, which is arranged in an expander head and, for the purpose of applying the rolling forces, is supported by means of a rotating support shaft. The rolling element moves epicyclically around the rotary axis of the support shaft, which runs eccentrically around the center axis of the pipe profiles. In order to shift the rolling element in the radial direction, the support shaft has a conical portion and can, in turn, be displaced in the axial direction. A support element that is embodied as a support roller, for example, is arranged on the expander head and supports the rolling forces against the inner surface of the inner pipe profile occurring on the rolling element. The expander head can be displaced along the pipe axis in order to create joining connections at various locations on the pipe profiles through expansion. This known device is also designed particularly for the joining of pipe profiles having smaller diameters.

In heavy-duty pipes, however, certain conditions are already present as a result of the large inside diameter of the pipe as well as metallurgic limitations. Namely, an outer pipe that it is generally (practically) impossible to expand elastically, which makes the necessary stable rolling-in of an inner cladding layer quite difficult. Heavy-duty pipes often not completely round, so that, due to the inhomogeneous pressing forces that occur in the presence of unroundness, it is difficult to achieve a uniformly stable connection of the cladding layer by a rotating support roller and an epicyclic rolling element driven by the same; that is, with a position-controlled pressing procedure.

Another coating device is described in WO 2004/103603 A1. This known coating device is designed to provide an outer pipe, which forms a carrier layer and is also referred to as a carrier pipe and has a cladding layer on the interior thereof. For this purpose, an inner pipe, also called a liner pipe or simply a liner, is pushed into the outer pipe and then expanded radially using an expander tool until it binds with the outer pipe, with the inner pipe being expanded plastically and the outer pipe being expanded in order to create a multilayer heavy-duty pipe. This process is repeated incrementally until the entire length of the heavy-duty pipe has been expanded. The expander tool is operated hydraulically (but dry), thus, excluding the possibility of the inner pipe coming into contact with the hydraulic fluid. The frictional mechanical bond between the two pipes is achieved by having the elastic resilience of the outer pipe be greater than the resilience of the inner pipe. This type of manufacture also influences the structure of the stable carrier pipe, and the combination of the materials of the inner pipe and of the carrier pipe must be selected such that the yield point of the inner pipe is lower than the yield point of the outer pipe, with corresponding limitations and drawbacks being associated with this.

During the manufacture of such multilayer heavy-duty pipes, the use of a coating device is also known which comprises a so-called hydroforming press (e.g., methods used by the Butting Group, a German-based pipe company). The inner pipe and the outer pipe are both slightly expanded by use of water pressure, with pressures being used that cause the outer pipe to flow, so that an outer casting is necessary in order protect the heavy-duty pipe from uncontrolled expansion and rupturing. Such a method has obvious drawbacks.

Another method for producing a multilayer heavy-duty pipe from an outer pipe and an inner pipe in the form of a largely frictionally connected cladding layer is described in DE 10 2013 103 811 B3. During manufacture, a carrier plate that already has a preformed initial bend is used, onto which a support plate is placed which is connected along its two longitudinal edges to the carrier plate, after which the interconnection to the multilayer heavy-duty pipe is formed and provided with a longitudinal weld seam. Such a method also has obvious drawbacks.

DE 10 2009 060 059 A1 also describes a method for producing a multilayer heavy-duty pipe. In this patent application, the wall of the heavy-duty pipe is formed from at least two metallic sheets that are integrally connected to one another by a solder introduced between the sheets. This type of connection requires special combinations of materials and a special production method that is adapted to them, which means that limitations exist from the outset.

Moreover, multilayer heavy-duty pipes are known which are plated with a cladding layer by metallurgic means as so-called "clad pipes" and thus, already formed in special production steps during the manufacture of the plate. When employing this procedure, however, narrow limits are set for the selection of material for many applications.

SUMMARY OF THE INVENTION

It is the object of the present invention to provide a method for producing a multilayer heavy-duty pipe and a coating device of the type mentioned above which offers a wider variety of possibilities for the application of a cladding layer.

This object is achieved with the features of the claims in the present application. The method has the following succession of steps. Introducing the inner pipe into the outer pipe; providing a pressure-exerting unit with at least one pressure roller that has a smaller diameter than the inside diameter of the inner pipe and is rotatably mounted with its rotary axis at a distance from a longitudinal axis of the inner pipe; applying a pressing force aligned radially outward against an inner surface of the inner pipe to the pressure roller; and rotating the pressure-exerting unit relative to the pipe unit while rolling the pressure roller on the inner surface of the inner pipe and pressing of an outer surface of the inner pipe against the inner surface of the outer pipe causing local plastic deformation of the inner pipe wall, with the pressure-exerting unit being simultaneously advanced axially during the rolling of the pressure roller relative to the pipe unit.

Preferably, during the rolling of the pressure roller, the pressing force is selected such that the outer pipe is not expanded or is expanded only slightly, below its yield point. In preferred embodiments, the pressure-exerting unit is advanced axially relative to the pipe unit during the rolling and by a distance between 1 mm and 10 mm per cycle of the pressure roller over an inner circumference of the inner pipe. The relative rotational speed between pressure-exerting unit and pipe unit is between 5 and 100 revolutions per minute.

It is also preferred that while the pressure roller is rolling, the pressure-exerting unit is supported by a support unit on the inner surface of the inner pipe. Preferably, the pressure-exerting unit is rotated relative to the pipe unit by an axle inserted coaxially into the pipe unit, the axle being rotated by a drive arranged either outside or inside of the pipe unit or the pipe unit is rotated by a rotary drive. The rotation of the pressure-exerting unit relative to the pipe unit, or the pressing force, is carried out or applied in a controlled or regulated manner. Preferably, the control or regulation is performed as a function of geometric or metallurgic material characteristics of the cladding layer.

In some preferred embodiments, a coating device for applying a cladding layer onto the inner side of a carrier layer during the production of a multilayer heavy-duty pipe, with a pressure-exerting unit having a force application unit, the coating device comprising a rolling tool with the pressure-exerting unit and the force application unit, the pressure-exerting unit is provided with at least one pressure roller having a diameter that is smaller than an inside diameter of a heavy-duty pipe to be produced, and with at least one support element acting diametrically counter thereto with a supporting force in an operating state, that the pressure-exerting unit has a pressure-bearing part on which the pressure roller is rotatably mounted, as well as a support-bearing part on which a support element is supported, the force application unit is arranged at least partially between the pressure-bearing part and the support-bearing part.

It is preferable, that the at least one support element is embodied as at least one support roller. In preferred embodiments, the pressure-bearing part and the support-bearing part can be displaced radially outward toward one another by a force application unit in relation to a rotary axle of the pressure roller.

Preferably, the force application unit has an adjusting unit that operates hydraulically or mechanically by spreading parts.

In highly preferred embodiments, the pressure roller is supported by a rotary axle in the pressure-bearing part and the support roller is rotatably mounted by a bearing axle in the support-bearing part. The pressure roller preferably has a flat, inclined, or outwardly conical or convex contact surface in cross-section.

The pressure-exerting unit is provided with a connecting section with a coupling part for connecting a central drive shaft and the connecting section is connected in a radially displaceable manner to the coupling part by an adapter thereby causing the pressure-exerting unit to be supported so as to float in relation to the drive shaft in preferred embodiments.

It is also preferable that the pressure-exerting unit has a housing-like construction with two housing parts, the support-bearing part being embodied in a housing base and the pressure-bearing part being embodied in a housing attachment, the housing base and the housing attachment are coupled by a force application unit so as to be radially displaceable relative to one another. A housing cover part is preferably mounted on the housing attachment and that a pivot bearing for a rotary axle of the pressure roller is embodied in the housing attachment.

Preferably, through the rolling-in and pressing-on (rolling-on) of the inner cladding layer continuously in the direction of rotation under plastic deformation and the simultaneous axial displacement of the pressure-exerting unit relative to the pipe unit, the cladding layer is applied and held frictionally in a uniformly stable and durable manner onto the inner surface of the carrier layer without the need to expand the outer pipe. The structure of the carrier layer, which forms a thick-walled, stable jacket, is therefore practically not impacted, so that combinations of materials having very different metallurgic and/or geometric characteristics (thicknesses) can be used to produce the heavy-duty pipe. A slight expanding of the carrier layer within its elastic limit is also possible, if desired.

The design of the original outer pipe and of the (at least one) original inner pipe can be freely selected for the most part, it only being necessary for the inside diameter of the outer pipe and the outside diameter of the adjacent inner pipe to be coordinated with one another such that the inner pipe can be easily inserted into the outer pipe and frictionally connected by means of the rolling process under expansion over the yield point or plastification along the inner surface of the outer pipe. A preferably smooth inner surface of the finished heavy-duty pipe is achieved if the feed rate of the pressure-exerting unit during the rolling of the pressure roller is coordinated with its rotational speed on the inner surface of the pipe unit such that the plastically deformed, helically revolving strips overlap (e.g., one or even multiple times).

It is preferable, in the coating device, a provision is made that it comprises a rolling tool with the pressure-exerting unit and the force application unit, and that the pressure-exerting unit is provided with at least one pressure roller having a smaller diameter than the inside diameter of the heavy-duty pipe to be produced as well as with at least one support element acting diametrically counter thereto with a supporting force in the operating state and the pressure-exerting unit has a pressure bearing part on which the pressure roller is rotatably mounted and has a support bearing part on which the support element is supported. It is highly preferable that the force application unit is arranged at least partially between the pressure bearing part and the support bearing part, i.e., within the pressure-exerting unit. The pressure bearing part and the support bearing part can be displaced radially toward one another by means of the force application unit in relation to a rotary axis of the pressure roller and thus also the central axis of the pipe unit.

This construction of the coating device makes it possible to continuously apply the cladding layer, particularly a cladding layer of an inner pipe inserted into an outer pipe as a stable carrier layer through rolling. As a result of the rolling process, the inner pipe is continuously expanded under plastic deformation and thus pressed in a stable and durable manner against the interior of the outer pipe without the need to expand the outer pipe, so that the material structure thereof can remain unaffected. Also, as a result, practically any combination of metallic materials can be selected for the inner pipe and outer pipe. Through the specified construction of the coating device, a plastic deformation of the inner pipe is brought about in order to form the cladding layer with a high level of pressing force applied using the pressure roller. Here, too, during the rolling of the pressure roller, the pressure-exerting unit, which is connected to a central (physical) axle, is passed axially over same in a continuous (uninterrupted) manner, thus resulting in the helically revolving strips during the rolling process.

In this regard, it is advantageous if, during the rolling of the pressure roller, the pressing force is selected such that the outer pipe is not expanded or is expanded only slightly, below its yield point.

The advantageous continuous procedure employed during the application of the cladding layer is thus maintained by having the pressure-exerting unit be fed axially forward relative to the pipe unit. The feed rate of the pressure-exerting unit is coordinated with the rotational speed of the pressure roller along the inner surface of the inner pipe such that a (practically) smooth contact surface or inner surface of the pressed inner pipe regions results. The selected physical parameters can also be established as a function of the material of the inner pipe and of the geometry of the (at least one) pressure roller. For example, the outer surface of the pressure roller can be embodied in its cross section so as to be straight and parallel to the longitudinal extension of the inner surface of the inner pipe or be conical or convexly arched toward the outside in order to achieve different pressing characteristics. In this way, the contact surface can be varied accordingly, and a rolling-on effect with local deformation of material (similar to a walking process) achieved more or less in the direction of rotation or more or less in the feed direction.

One advantageous and preferable variant of the method is characterized in that, for example, the pressure-exerting unit is advanced axially relative to the pipe unit by a distance between 1 mm and 10 mm per cycle of the pressure roller over the inner circumference of the inner pipe.

Another advantageous and preferable variant of the method is characterized in that, for example, the relative rotational speed between pressure-exerting unit and pipe unit is between 5 and 100 revolutions per minute.

Preferably, high-pressing forces can be created by having the pressure-exerting unit be supported by a support unit on the inner surface of the inner pipe while the pressure roller is rolling. The support unit can be supported on the inner surface of the inner pipe in a sliding manner or with one or more support rollers arranged at the base angles of an isosceles (acute-angled) triangle. In the latter case, the pressure roller is preferably arranged in extension of the bisector of the central angle of the isosceles triangle.

One preferred embodiment that is advantageous for the execution of the method is also characterized in that the pressure-exerting unit is rotated relative to the pipe unit by means of an axle inserted coaxially into the pipe unit, with the axle being rotated by means of a drive arranged outside or inside of the pipe unit and/or the pipe unit is rotated by means of a rotary drive.

Moreover, for the function and optimization of the production process, measures to the effect that the rotation of the pressure-exerting unit relative to the pipe unit and/or the pressing force is carried out or applied in a controlled or regulated manner are advantageous.

Other preferable advantageous measures are characterized in that the control or regulation is performed as a function of geometric and/or metallurgic material characteristics of the cladding layer.

Moreover, measures that are characterized in that the at least one support element is embodied as at least one support roller contribute to the good functioning of the coating device with an advantageous design.

Other preferable measures that are advantageous for the functioning and construction are characterized in that the pressure bearing part and the support bearing part can be displaced radially outward toward one another by means of the force application unit in relation to a rotary axis of the pressure roller or the central axis of the pipe unit, so that, for the purpose of rolling on the cladding layer, the pressure roller can be pushed counter to the supporting force with the required pressing force against the interior of the cladding layer or of the inner pipe in the operating state.

Various design variants for applying the radially aligned pressing forces that are transmitted via the pressure roller to the inner pipe in order to deform the cladding layer are characterized in that the force application unit has an adjusting mechanism that is operated hydraulically or by means of solid, mechanically cooperating spreading parts.

Another preferable measure that is advantageous for the construction and function is characterized in that the pressure roller is supported in the pressure bearing part by means of a rotary axle in the pressure bearing part.

Furthermore, a provision is advantageously made that the support roller is rotatably mounted in the support bearing part by means of a bearing shaft.

The deformation of the inner pipe in order to form the cladding layer can be influenced in various ways by having the pressure roller have a flat, inclined, or outwardly conical or convex contact surface in cross section. For example, depending on the material of the cladding layer, it can be ensured in this way that, during the continuous pressing with a (simultaneous) slight feed, the pressure regions lining up (continuously) one after another in the manner of a helix are more or less wide and/or overlap to a greater or lesser extent in order to obtain a maximally homogeneous, smooth interior surface of the pressed cladding layer.

Furthermore, as for the connection to a central leading axle or central drive shaft, measures are advantageous that are characterized in that the pressure-exerting unit is provided with a connecting section with a coupling part for connecting the central drive shaft. By the central drive shaft, the pressure-exerting unit can be rotated relative to the inner surface of the multilayer heavy-duty pipe, with the pressure-exerting unit being rotatable when the heavy-duty pipe is at rest, or the heavy-duty pipe being rotatable when the pressure-exerting unit is not rotating, or the heavy-duty pipe and the pressure-exerting unit being rotatable at different rotational speeds, and with the pressure roller rolling against the inner surface. At the same time, the relative feed between heavy-duty pipe and pressure-exerting unit can be performed in order to produce the axial feed during the helical pressing movement.

Moreover, a preferable provision is advantageously made here that the connecting section is connected in a radially displaceable manner to the coupling part by means of an adapter, so that the pressure-exerting unit is supported so as to float in the radial direction in relation to the drive shaft. This measure contributes to the achieving of uniform pressure and to a stable coating with the cladding layer.

Additional preferred advantages for the construction and the function can be achieved by providing the pressure-exerting unit with a housing-like construction with two housing parts, with the support bearing part being embodied in a housing base and the pressure bearing part being embodied in a housing attachment, and by having the housing base and the housing attachment be coupled by means of the force application unit such that they can be displaced radially relative to one another.

Other additional preferred measures that are advantageous for the construction and function are characterized in that a housing cover part is mounted on the housing attachment and that a pivot bearing is embodied in the housing attachment for the rotary axle of the pressure roller.

BRIEF DESCRIPTION OF THE DRAWINGS

The drawings illustrate a preferred embodiment including the above-noted characteristics and features of the device. The device will be readily understood from the descriptions and drawings. In the drawings:

FIGS. 5A, 5B and 5C show a transparent representation of the pressure-exerting unit in a side view, rear view, and top view.

DETAILED DESCRIPTION OF THE DRAWINGS

Figure 1:
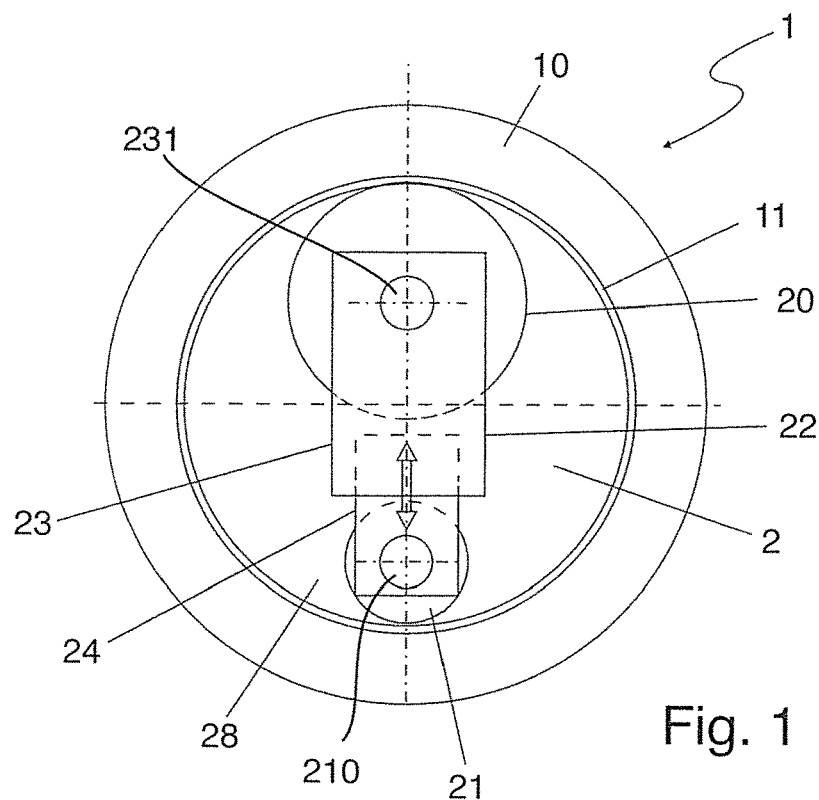
FIG. 1 shows a front-side schematic representation of a pipe unit consisting of outer pipe and inner pipe with a pressure-exerting unit inserted.

Referring to FIGS. 1-5C, a pipe unit 1 in accordance with the present invention is generally designated by the reference numeral 1. FIG. 1 shows a pipe unit 1 consisting of an outer pipe 10, which forms a stable, outside metallic carrier layer 10, and an inner pipe 11, which forms an inside metallic cladding layer 11 that is thinner in comparison to the carrier layer, as well as a pressure-exerting unit 22 (shown schematically) that is inserted into the interior of pipe unit 1 in order to press the inner pipe 11 in a frictional and enduringly stable manner against the inner surface of the outer pipe 10 in a rolling-in process and obtain a multilayer heavy-duty pipe with coated interior. The term "heavy-duty pipe" is to be understood as referring to pipes having diameters of at least 150 mm and a total wall thickness of at least 5 mm, with the thickness of the carrier layer being a multiple of the thickness of the cladding layer. The material characteristics of the cladding layer are selected such that they resist, as well and as permanently as possible, the mechanical, physical, and/or chemical effects of a material to be conveyed. To this end, it provides a substantial advantage if the selection of material is limited as little as possible by the production method, which is achieved through the rolling-in and rolling-on process.

Pressure-exerting unit 22 introduced into the interior of the pipe is part of a rolling tool 2 and has a pressure roller 20 with a diameter that is substantially smaller than the inside diameter of inner pipe 11. In the operating state, pressure roller 20 is mounted in a pressure bearing part 23 so as to be rotatable about a rotary axis 231 that is parallel to the pipe axis. As a support element, a support roller 21 is arranged so as to be diametrically opposed to pressure roller 20 in relation to the pipe axis during the rolling-on process, which support roller 21 is supported on the inner surface of inner pipe 11 during the rolling-in process in order to offer sufficient supporting force to press the pressure roller 20 during the rolling-in process.

Support roller 21 is mounted so as to be rotatable about a bearing axle 210 that is parallel to the longitudinal axis of pipe unit 1 and received in a support bearing part 24 of pressure-exerting unit 22, particularly in a support unit 28. Pressure bearing part 23 and support bearing part 24 are supported in pressure-exerting unit 22 so as to be displaceable diametrically (in the radial direction) toward one another in relation to the pipe axis, for example, hydraulically or by a mechanical adjustment mechanism, as shown by the double arrow in FIG. 1. Instead of only one support roller, it is also possible for several support rollers 21 to be present, preferably support rollers 21 that are arranged with the same angular separation from the diagonal of the inner pipe through the rotary axis 231 of pressure roller 20 and/or several support rollers 21 spaced apart from one another in the direction of the pipe axis. Instead of only one pressure roller 20, several can also be present.

Figure 2:
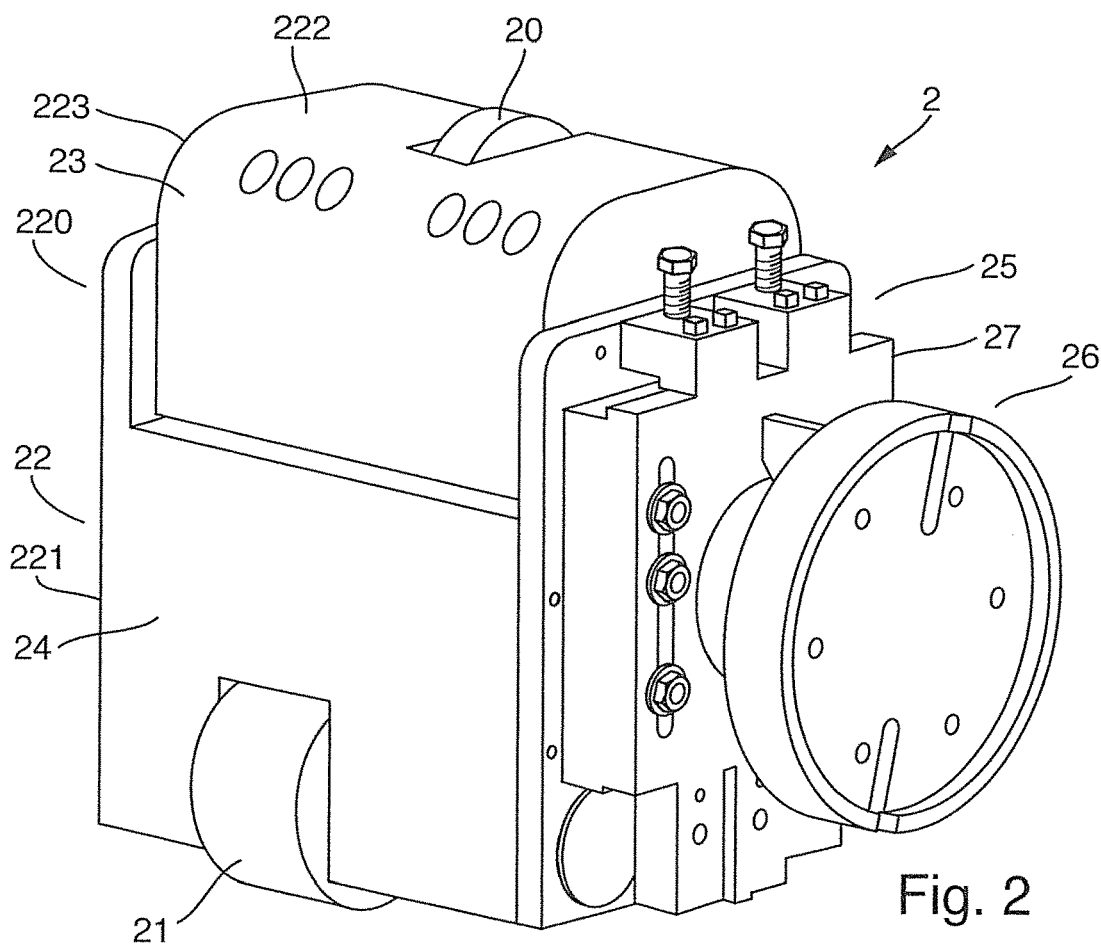
FIG. 2 shows a perspective view of a pressure-exerting unit.

In the exemplary embodiment of a rolling-on tool 2 with pressure-exerting unit 22 shown in a perspective view in FIG. 2, for example, support bearing part 24 has two support rollers 21 which, when in the inserted state of pressure-exerting unit 22, are arranged to as to be offset in relation to the diagonal of inner pipe 11 through rotary axis 231 of pressure roller 20 in equal angular intervals (symmetrically), although only one of the two support rollers 21 is visible in FIG. 2.

In order to drive pressure-exerting unit 22 so as to rotate about a rotary axis that is concentric to the pipe axis, it is connected via a connecting section 25 to an adapter 27 and a coupling part 26 to a stable axle or drive shaft (not shown) and driven in a rotating manner by means of a drive unit 1 (also not shown) arranged outside or inside of pipe unit 1 in order to cause pressure roller 20 to roll in the direction of rotation over the inner surface of inner pipe 11 and thus, carry out the rolling-in process for applying the cladding layer.

Coupling part 26 and adapter 27 of connecting section 25 can be displaced toward one another in the radial direction in order to floatingly mount and, optionally, to center pressure-exerting unit 22 in the interior of the pipe, and coupling part 26 has a flange-like design in order to create a stable connection to the front side or a mating flange of the axis or drive shaft.

As is shown in FIG. 2, pressure-exerting unit 22 is embodied in the manner of a housing with two housing parts, namely a housing base 221, in which the support bearing part is embodied, and a housing attachment 223, in which pressure bearing part 23 is embodied. Housing base 221 with support bearing part 24 and housing attachment 223 with pressure bearing part 23 are displaceably coupled with one another via a force application unit such that they can be pressed outwardly apart radially to rotary axle 231 or to bearing axle 210 and thus, also to the axle or drive shaft or to the axis of the heavy-duty pipe and displaced inwardly toward one another. For this purpose, an adjusting unit is arranged between the two housing parts that provides for stable guidance in the radial direction.

The force application unit is embodied as a hydraulically operated piston/cylinder unit, for example, by which the compressive force required to press pressure roller 20 can be applied in a well-controlled and regulated manner. Housing attachment 223 is covered toward the outside with a housing cover part 222 in which a slot-like opening extending transverse to the rotary axle 231 is disposed through which a portion of pressure roller 220 protrudes outward in order to roll on the interior of the cladding layer during the creation thereof. The outer contour of housing cover part 222, as well as the other parts of housing 220, are dimensioned and shaped such that rotation can occur without hindrance within the inner pipe during the rolling-on process, with support rollers 21 also being supported on the interior of the inner pipe.

Figure 3:
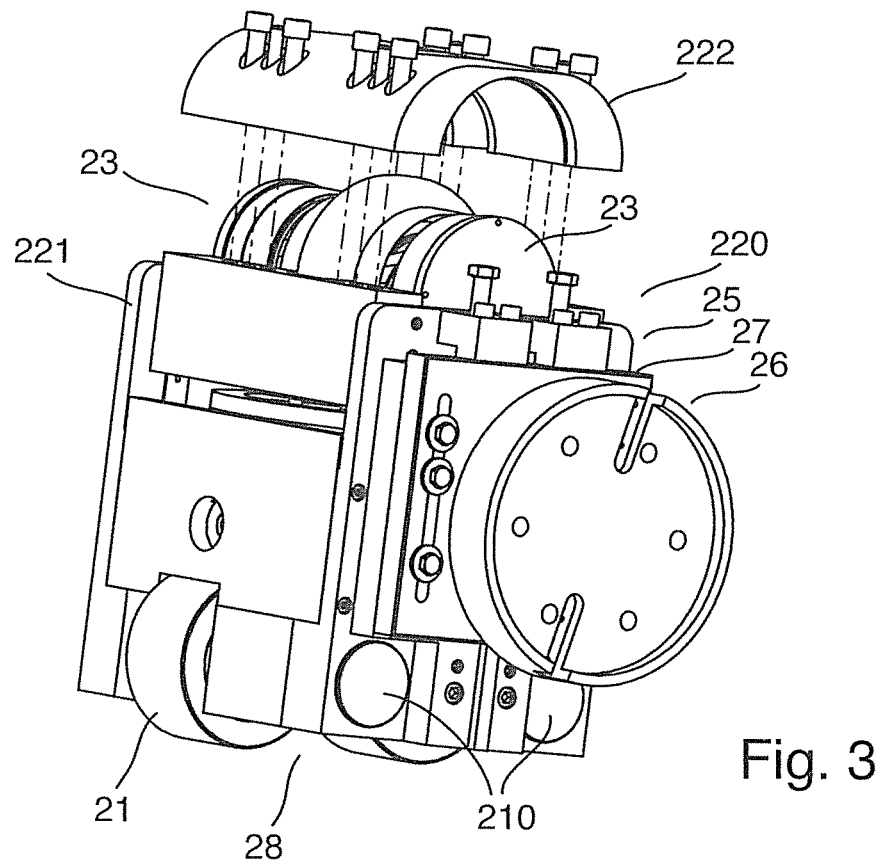
FIG. 3 shows a perspective view of a partially opened pressure-exerting unit.
Figure 4:
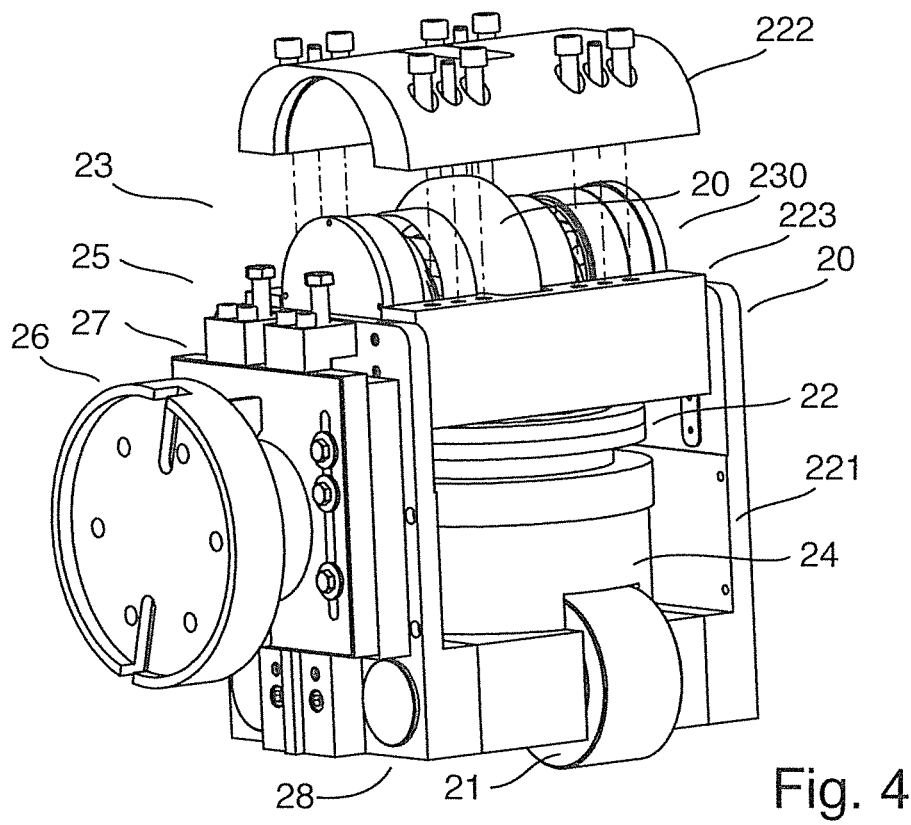
FIG. 4 shows another perspective view of a pressure-exerting unit that is partially opened even further.

FIGS. 3 and 4 show housing 220 in a partially open state, with housing cover part 222 being lifted off in FIG. 3 and with a side wall of housing base 221 being additionally removed in FIG. 4. Housing cover part 222 is clamped stably to lateral wall portions of housing attachment 223 by screws. A pivot bearing 230 with rotary axle 231 is embodied in housing attachment 223, with rotary axle 231 being held stable by a roller or antifriction bearings on the interior of housing attachment 223 in order to ensure a reliable rolling process and well-defined guidance even under high pressing forces.

As can be seen from FIGS. 5A and 5C, pivot bearing 230 has a centering construction with an oblique arrangement of the rolls or rollers, so that the roll-off line of pressure roller 20 is maintained with precision and pressure roller 20 is prevented from tipping over. The inner surfaces of housing attachment 223 are provided with receptacles that are adapted to the bearing elements of pivot bearing 230.

As can be seen from FIG. 4, housing attachment 223 is guided outside of the force application unit formed by the piston/cylinder unit between a front housing wall facing toward connecting section 25 and a rear housing wall at a distance from same, with guide structures for being embodied in the front and rear housing walls for counterguide structures in the side walls of housing attachment 223 that are adapted thereto. Bearing axles 210 of support rollers 21 are supported in the lower region of the front and read housing walls as well as in a bottom-side housing wall of housing base 221, with support rollers 21 protruding with their outer contour in the lower edge region of housing 221 and on the underside and the respective outer side of the housing walls in order to ensure unimpeded rolling. Protruding support rollers 21 and the oppositely situated pressure roller 20 that protrudes over housing cover part 222 are particularly also visible in FIG. 5B.

In order to introduce pressure-exerting unit 22 or pressure-exerting head of the rolling tool 2 into pipe unit 1, pressure bearing part 23 and support bearing part 24 can be moved diametrically together far enough in order to subsequently move them apart in the desired axial position and apply the required compressive force to pressure roller 20 hydraulically or by means of an adjustment mechanism while supported against support roller(s) 21 in order to roll-in inner pipe 11 and form the cladding layer.

During the rolling-in process, the pressing force on pressure roller 20 is increased to the extent that, during rolling-off in the circumferential direction on the inner surface of inner pipe 11, inner pipe 11 is pressed against the inner surface of outer pipe 10 and deformed plastically locally to the point that the cladding layer formed remains stably and frictionally on the inner surface of the outer pipe.

Simultaneously, during the rotation of pressure-exerting unit 22 and thus, rolling of the pressure roller 20 in the circumferential direction over the inner surface of inner pipe 11, pressure-exerting unit 22 is pushed forward with the drive shaft. The feed rate is selected such that the plastically deformed strip running helically around with a slight pitch is overlapped by at least the next plastically deformed strip that also runs helically around, and so on, until the cladding layer has been rolled on over desired length in outer pipe 10. As a result of the at least single overlapping of the continuous plastically deformed strips, a practically very smooth structure is obtained on the inner surface of the cladding layer, as investigations conducted by the inventors have shown.

During the rolling-in process, the rotational speed or revolutions per minute and the feed rate can be optimally coordinated with the respective material of inner pipe 11 as a function of geometric and metallurgic characteristics. The cross-sectional contour (e.g., flat, conical, or outwardly convex) and/or the diameter of hardened pressure roller 20 as well as the material thereof can also be selected appropriately.

The pressing force of pressure roller 20 is selected such that outer pipe 10 is at least substantially not deformed. As a result, the microstructure of the carrier layer is not negatively impacted by the coating process. If desired, however, a slight expansion of outer pipe 10 within the yield point of the carrier layer can be permitted.

All weldable, corrosion-resistant steels, nickel, nickel alloys, and titanium, inter alia, can be used as material for inner pipe 11 (protective pipe, liner pipe, inliner, liner). Carbon steel is preferably considered for the thick-walled outer pipe (carrier pipe).

Instead of or in addition to the rotating of pressure-exerting unit 22 during the rolling-in process, pipe unit 1 can be rotated relative to pressure-exerting unit 22 in order to bring about the rolling-in process.

The described method can also be used for the locally limited production or restoration of a mechanical bond of a pipe-in-pipe system of the abovementioned type. It is also possible to use several coordinated inner pipes in outer pipe 10 (simultaneously or successively) and roll them into a multilayer cladding layer in the described manner.

The rolling-in process with pressure-exerting unit 22 allows for a wide control or regulating range for the rolling force and thus of the local degree of deformation of the cladding layer (inliner). The maximum possible frictional connection of outer pipe 10 and inner pipe 11 (pipe partners) depends on the thickness of inner pipe 10, the mechanical characteristics, the local degree of deformation during rolling-in, and the frictional properties.

The described method makes it possible to use materials for inner pipe 11 or cladding layer that have a higher yield point in comparison to the material of outer pipe 10 during the production of multilayer heavy-duty pipes. Besides the advantageous manufacturing method, this offers an additional advantage over multilayer pipes that have been provided in a known manner with a coating, such as hydroforming, for example, in which the material of the cladding layer must have a lower yield point in order for a frictional connection to be created after the expansion of the inner and outer pipes and the subsequent common shrinkage of the two pipes.

A wide variety of materials are available for the various parts discussed and illustrated herein. While the principles of this invention have been described in connection with specific embodiments, it should be understood clearly that these descriptions are made only by way of example and are not intended to limit the scope of the invention.

The invention claimed is:

1. A coating device by which a cladding layer is applied onto the inner side of a carrier layer during the production of a multilayer heavy-duty pipe, with a pressure-exerting unit provided with a connecting section with a coupling part for connecting a central drive shaft and having a force application unit, the coating device comprising a rolling tool with the pressure-exerting unit and the force application unit, the pressure-exerting unit is provided with at least one pressure roller rolling on an inner surface of the cladding layer in an operating state and having a diameter that is smaller than an inside diameter of a heavy-duty pipe to be produced, and with at least one support element embodied as at least one support roller and acting diametrically counter to the at least one pressure roller with a supporting force in the operating state, while rolling on the inner surface of the cladding layer, that the pressure-exerting unit has a pressure-bearing part on which the at least one pressure roller is rotatably mounted, as well as at least one support-bearing part on which the at least one support element is supported, the force application unit is arranged at least partially between the pressure-bearing part and the support-bearing part, wherein the at least one pressure roller is supported by a rotary axle in the pressure-bearing part and the at least one support roller is rotatably mounted by a bearing axle in the at least one support-bearing part, the pressure-bearing part and the at least one support-bearing part are radially displaceable outward relative to one another by the force application unit in relation to the rotary axle of the at least one pressure roller, the force application unit has an adjusting unit that operates hydraulically and the pressure-exerting unit has a housing-like construction with two housing parts, the at least one support-bearing part being embodied in a housing base and the pressure-bearing part embodied in a housing attachment, the housing base and the housing attachment are coupled by the force application unit so as to be radially displaceable relative to one another, wherein the housing attachment is guided outside of the force application unit embodied as a hydraulically operated piston-cylinder unit between a front housing wall of the housing base facing toward the connecting section and a rear housing wall of the housing base away from the connecting section at a distance from the front housing wall.

2. The coating device of claim 1 wherein the at least one pressure roller has a flat, inclined, or outwardly conical or convex contact surface in cross-section.

3. The coating device of claim 1 wherein the connecting section is connected in a radially displaceable manner to the coupling part by an adapter thereby causing the pressure-exerting unit to be supported so as to float in relation to the drive shaft.

4. The coating device of claim 1 characterized in that a housing cover part is mounted on the housing attachment and that a pivot bearing for a rotary axle of the at least one pressure roller is embodied in the housing attachment.

5. A method for producing a multilayer heavy-duty pipe with a pipe unit that is composed of an outer pipe forming a carrier layer and at least one inner pipe forming a cladding layer, comprising:
introducing the inner pipe into the outer pipe;
providing the coating device of claim 1;
applying a pressing force aligned radially outward against an inner surface of the inner pipe to the at least one pressure roller; and
rotating the pressure-exerting unit relative to the pipe unit while rolling the at least one pressure roller on the inner surface of the inner pipe and pressing of an outer surface of the inner pipe against an inner surface of the outer pipe causing local plastic deformation of the inner pipe wall, with the pressure-exerting unit being simultaneously advanced axially during the rolling of the pressure roller relative to the pipe unit.

6. The method of claim 5 wherein during the rolling of the at least one pressure roller, the pressing force is selected such that the outer pipe is not expanded or is expanded only slightly, below its yield point.

7. The method of claim 5 wherein the pressure-exerting unit is advanced axially relative to the pipe unit by a distance between 1 mm and 10 mm per cycle of the pressure roller over an inner circumference of the inner pipe.

8. The method of claim 5 wherein the relative rotational speed between the pressure-exerting unit and the pipe unit is between 5 and 100 revolutions per minute.

9. The method of claim 5 wherein while the pressure roller is rolling, the pressure-exerting unit is supported by a support unit on the inner surface of the inner pipe.

10. The method of claim 5 wherein the pressure-exerting unit is rotated relative to the pipe unit by an axle inserted coaxially into the pipe unit, the axle being rotated by a drive arranged either outside or inside of the pipe unit or the pipe unit is rotated by a rotary drive.

11. The method of claim 10 wherein the rotation of the pressure-exerting unit relative to the pipe unit, or the pressing force, is carried out or applied in a controlled or regulated manner.

12. The method of claim 11 wherein the control or regulation is performed as a function of geometric or metallurgic material characteristics of the cladding layer.

* * * * *